(12) United States Patent
Todorov

(10) Patent No.: US 6,564,247 B1
(45) Date of Patent: May 13, 2003

(54) SYSTEM AND METHOD FOR REGISTERING USER IDENTIFIERS

(75) Inventor: Danton I. Todorov, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,725

(22) Filed: Nov. 18, 1999

(51) Int. Cl.[7] .............................................. G06F 15/16
(52) U.S. Cl. ........................ 709/206; 709/246; 713/201; 707/1
(58) Field of Search ................................ 709/223, 246, 709/206; 713/200, 201, 202; 380/25; 714/4; 707/1, 104

(56) References Cited

U.S. PATENT DOCUMENTS

| | | | |
|---|---|---|---|
| 5,073,933 A | 12/1991 | Rosenthal | 380/25 |
| 5,120,939 A | 6/1992 | Claus et al. | 235/382 |
| 5,421,011 A | 5/1995 | Camillone et al. | 395/650 |
| 5,490,216 A | 2/1996 | Richardson, III | 380/4 |
| 5,594,722 A | 1/1997 | Iida et al. | 370/426 |
| 5,627,967 A | 5/1997 | Dauerer et al. | 395/188.01 |
| 5,694,595 A | 12/1997 | Jacobs et al. | 395/609 |
| 5,768,519 A * | 6/1998 | Swift et al. | 707/9 |
| 5,790,785 A | 8/1998 | Klug et al. | 395/188.01 |
| 5,944,794 A * | 8/1999 | Okamoto et al. | 380/30 |
| 6,161,139 A * | 12/2000 | Win et al. | 709/223 |
| 6,182,131 B1 * | 1/2001 | Dean et al. | 709/222 |
| 6,269,405 B1 * | 7/2001 | Dutcher et al. | 707/201 |
| 6,292,904 B1 * | 9/2001 | Broomhall et al. | 709/217 |
| 6,142,070 A1 * | 6/2002 | Van Dyke et al. | 713/200 |

* cited by examiner

Primary Examiner—Mehmet B. Geckil
(74) Attorney, Agent, or Firm—Shelley M. Beckstrand

(57) ABSTRACT

An ID administration tool includes a request for service (RFS) database, including an approval queue and an error queue. An ID creation database includes registration code, an approved requests file, and a profile documents. A plurality of requests for new user IDs are received into the RFS database, queued in the approval queue, moved to the approved requests file where they are sorted by profile and processed in profile groups to generate the new user IDs.

15 Claims, 7 Drawing Sheets

SYSTEM AND METHOD FOR REGISTERING USER IDENTIFIERS

BACKGROUND OF THE INVENTION

1. Technical Field of the Invention

This invention pertains to distributed systems, such as distributed mail and application systems. More particularly, it relates to an automated process for registering user IDs in such systems.

2. Background Art

In an enterprise environment involving distributed mail and application systems, such as Lotus Notes (TM), there is a need for an automated way to create user identifiers (IDs). For example, heretofore Lotus Notes native tools do not provide an easy way to create hundreds of user IDs at one time. The input is limited to either using a text file or manually entering the information. Consequently, there is a need to give an administrator of such a system the ability to create an unlimited number of IDs with very little manual interaction.

Heretofore, other third-party ID registration systems (not Notes native) provide no way of specifying organization unit or different expiration dates and have been bound to a single password certifier.

User identifier (ID) creation (a.k.a. user registration) process is a key administration process that in any enterprise environment could be a very long, time and labor consuming process. There is a need in the art to automate this procedure and reduce significantly the human interaction. Furthermore, there is a need in the art for a method and means for registering a practically unlimited number of user IDs in a very short period of time.

It is an object of the invention to provide a reliable and robust system and method for performing user registration.

It is an object of the invention to provide a system and method for registering user identifiers (ID's) for distributed systems.

It is a further object of the invention to provide a system and method for registering user ID's for distributed mail and application systems.

It is a further object of the invention to provide a system and method for addition of newly created IDs to specific groups of ID's.

It is a further object of the invention to provide a system and method for automating ID registration.

It is a further object of the invention to provide a system and method for providing a plurality of certifiers for use in initial ID registration.

It is a further object of the invention to provide a system and method for generating user ID files, verifiable by a certifier, for storage on the user's desktop.

SUMMARY OF THE INVENTION

In accordance with the invention, a system and method is provided for creating a user identifier (ID) according to the steps of receiving an ID request from a user into a source database; approving and storing the ID request into an ID creation queue; initiating an ID creation process with respect to the ID creation queue; and selectively upon failure updating the ID request with a failure indication and upon success notifying user and closing the ID request.

In accordance with an aspect of the invention, there is provided a computer program product configured to be operable to create a user identifier (ID) by receiving an ID request from a user into a source database; approving and storing the ID request into an ID creation queue; initiating an ID creation process with respect to the ID creation queue; and selectively upon failure updating the ID request with a failure indication and upon success notifying user and closing the ID request.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 shows arrangement of FIGS. 3A and 3B.

BEST MODE FOR CARRYING OUT THE INVENTION

In accordance with a preferred embodiment of the invention, an ID administration tool provides for accepting a database containing a plurality of requests for new user ID's sorted by predefined ID creation profiles, accessing a plurality of certifiers for each of the requests to create the user ID with and for future verification of the ID, for placing each user into one or more predefined groups, each of the groups having access to predefined databases, sending welcome notes to each user, and generating and sending initial passwords and user ID's to one or more designated persons for each user.

In accordance with an aspect of the invention, data required for registering an ID is entered in a Notes database by a customer or a help desk as a Notes Document, thus moving the burden of entering the user data from the administrator of a distributed mail and/or application system, such as Lotus Notes, to the cheaper help desk.

Further in accordance with an aspect of the method of the invention, specific information for a new user account is entered in a database as a request. In a specific embodiment of the invention, that database may be a Lotus Notes database. The information in this request is then transferred to an ID creation database where, based upon information in the request and in a selected profile document, a user ID file is created and a person document in an address book, such as, in a specific embodiment, a Notes Address Book. Additional options, which may be configured in the profile document, include creating a mail file; selecting type of ID, license and shortname, expiration period, and organizational unit; creating a document in the database where all passwords and ID files are stored; sending a welcome note to the end user; sending a password and ID file to a designated person; creating a mail file replica on a backup server; utilizing a certifier with two or more passwords; adding new users to groups; and enforcing corporate ID standards to the profile of a business unit. Once initiated, the ID creation or registration process does not need any human intervention. In case of failure, the status of the request is updated with the error that occurred.

Figure 4:
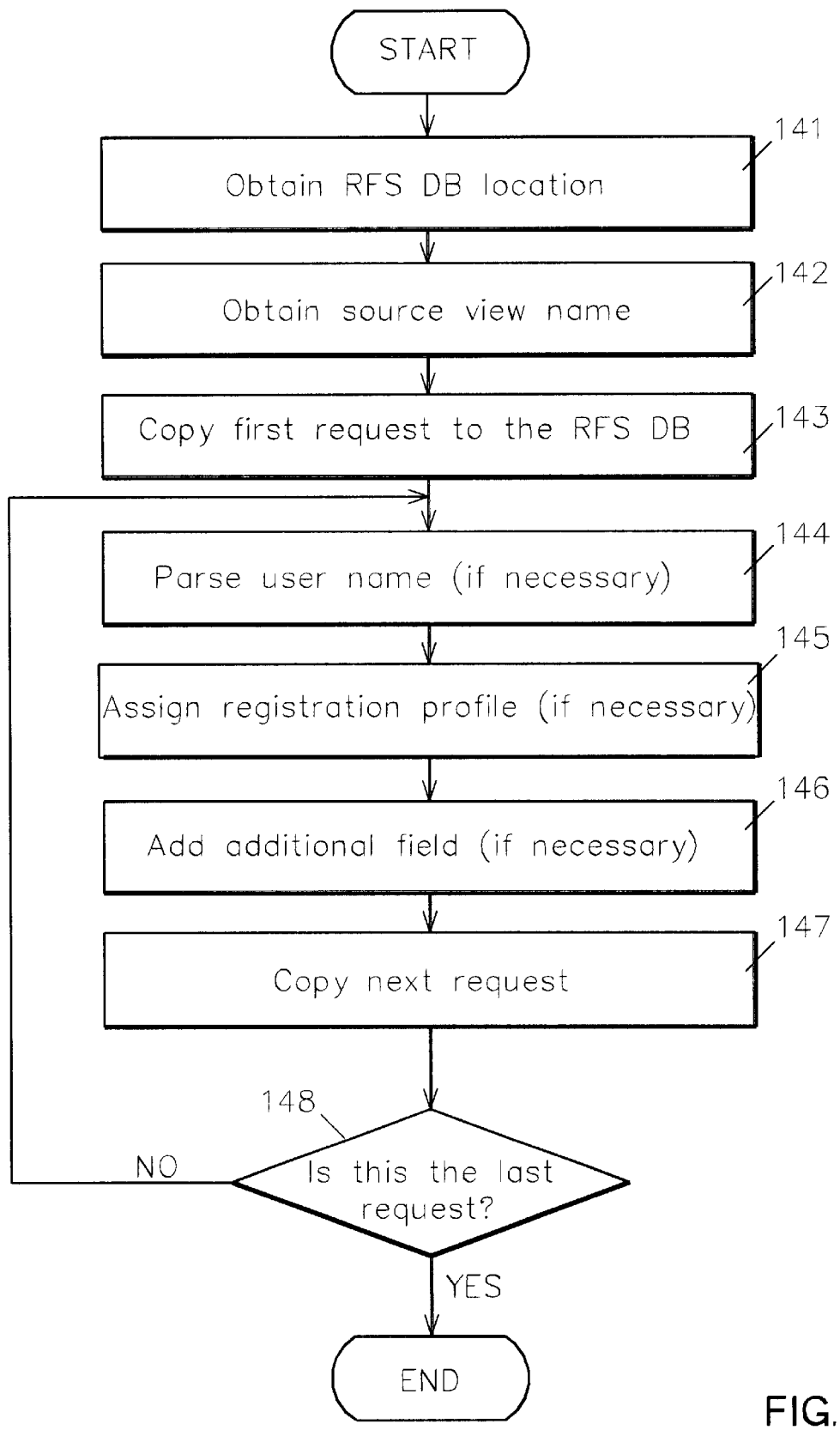
FIG. 4 is a detailed block diagram of step 2 of ID registration process—modifications made in the request document when copied to the ID creation database.
Figure 5:
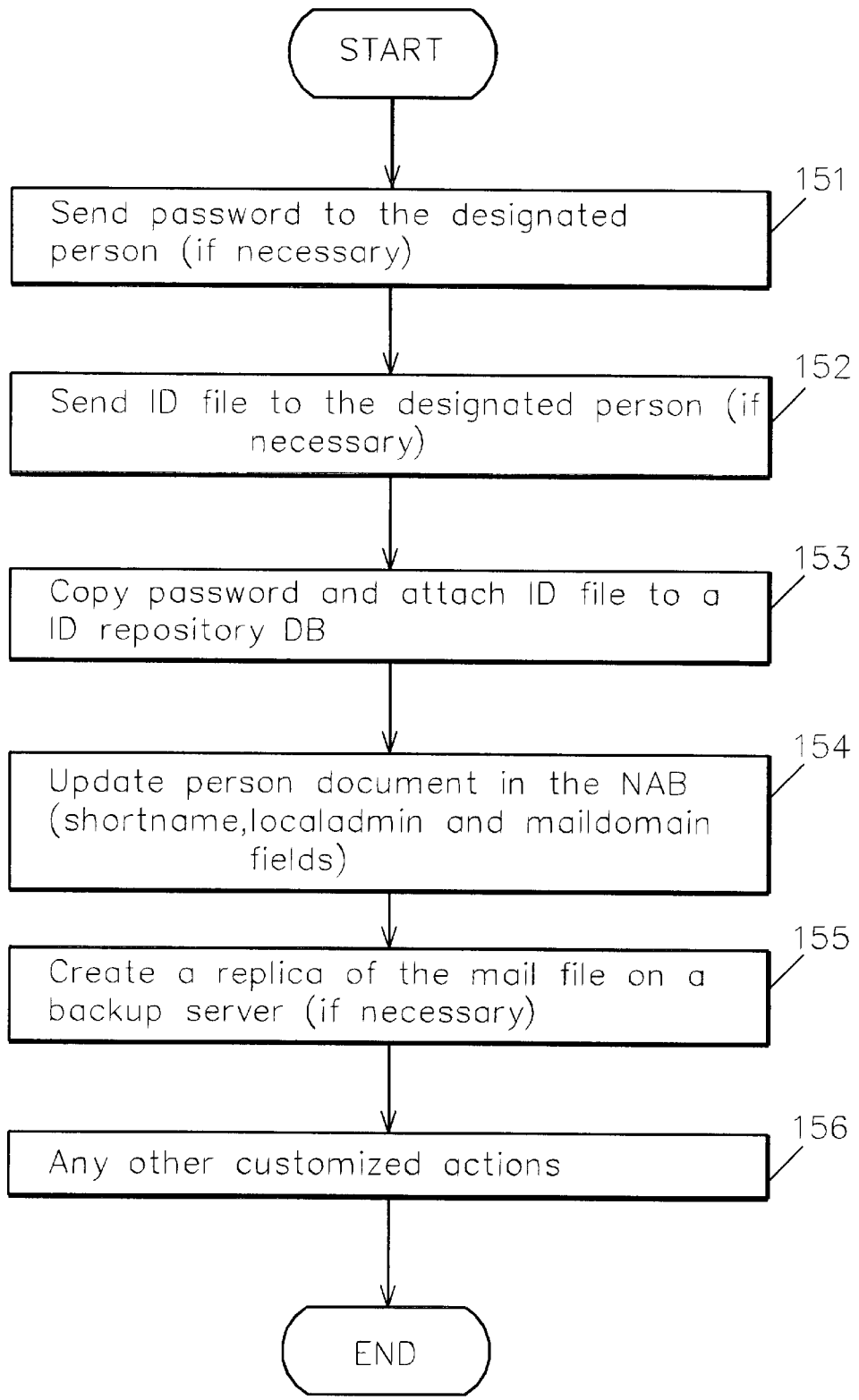
FIG. 5 provides detailed information on the possible post-registration tasks.
Figure 6:
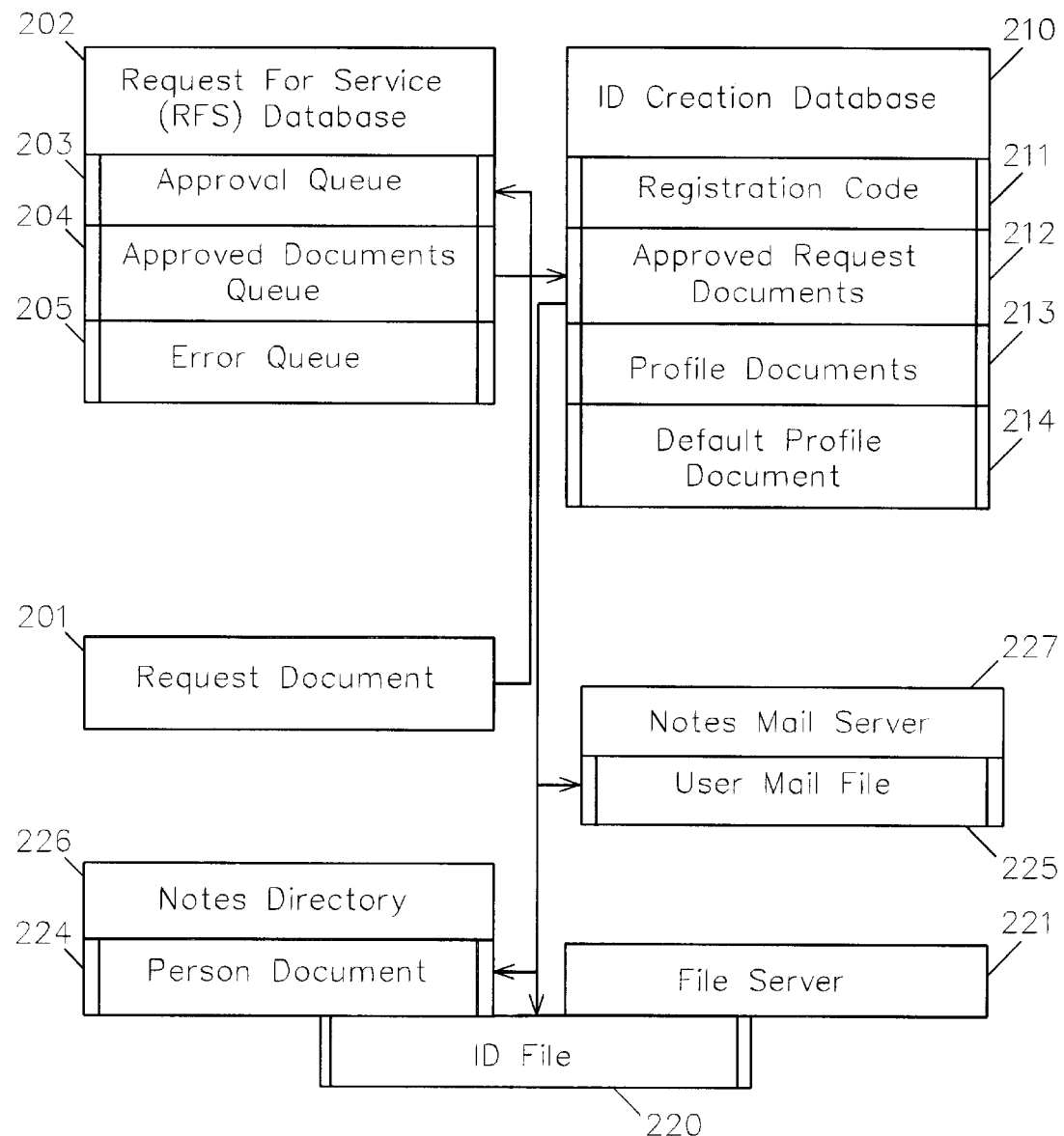
FIG. 6 is a high level system diagram illustrating the major components, including code and data files, of the preferred embodiment of the system of the invention.

Referring to the figures, the method of the preferred embodiment of the invention set forth in FIGS. 1–5 executes with respect to the system of data and procedure files illustrated in FIG. 6.

Referring to FIG. 6, the system of the invention includes RFS database 202, including approval queue 203, approved requests queue 204 and error queue 205. ID creation database 210 includes registration code 211, approved request documents 212, profile documents 213, and default profile document 214. One the approved documents 204 are copied to the ID creation database 210 by the registration code 211, they are automatically sorted by profile name in approved request documents queue 212. Further, the registration code 211 creates a person document 224 in directory 226, such as a Notes/Domino Directory, and eventually attaches the ID file 220 to the person document 224 or stores the ID file 220 on a file server 221, according to settings in the profile document 213 and the default profile document 214. Registration code 211 may also create a user mail file 225 on the mail server 227. Person document 224 contains vital information about the users and their interaction with the mail and application system. Information such as user name, name aliases, mail server and file location, forwarding address, short name, and is part of the person document 224. The ID file 220 is located on the user's desktop and is the only key that gives access to the distributed system, such as a Notes environment. The user needs a password to open the ID file 220. A copy of the ID file 220 can be stored on file server 221 for backup purposes. The mail server 227 may be a Notes server where the user's mail file 225 is located. The mail file 225 contains all the e-mail messages owned (received, sent, or drafted) by the user. The mail file 225 may also contain calendar data. The relationship and operation of the system components will be further described in connection with FIGS. 1–5.

Figure 1:
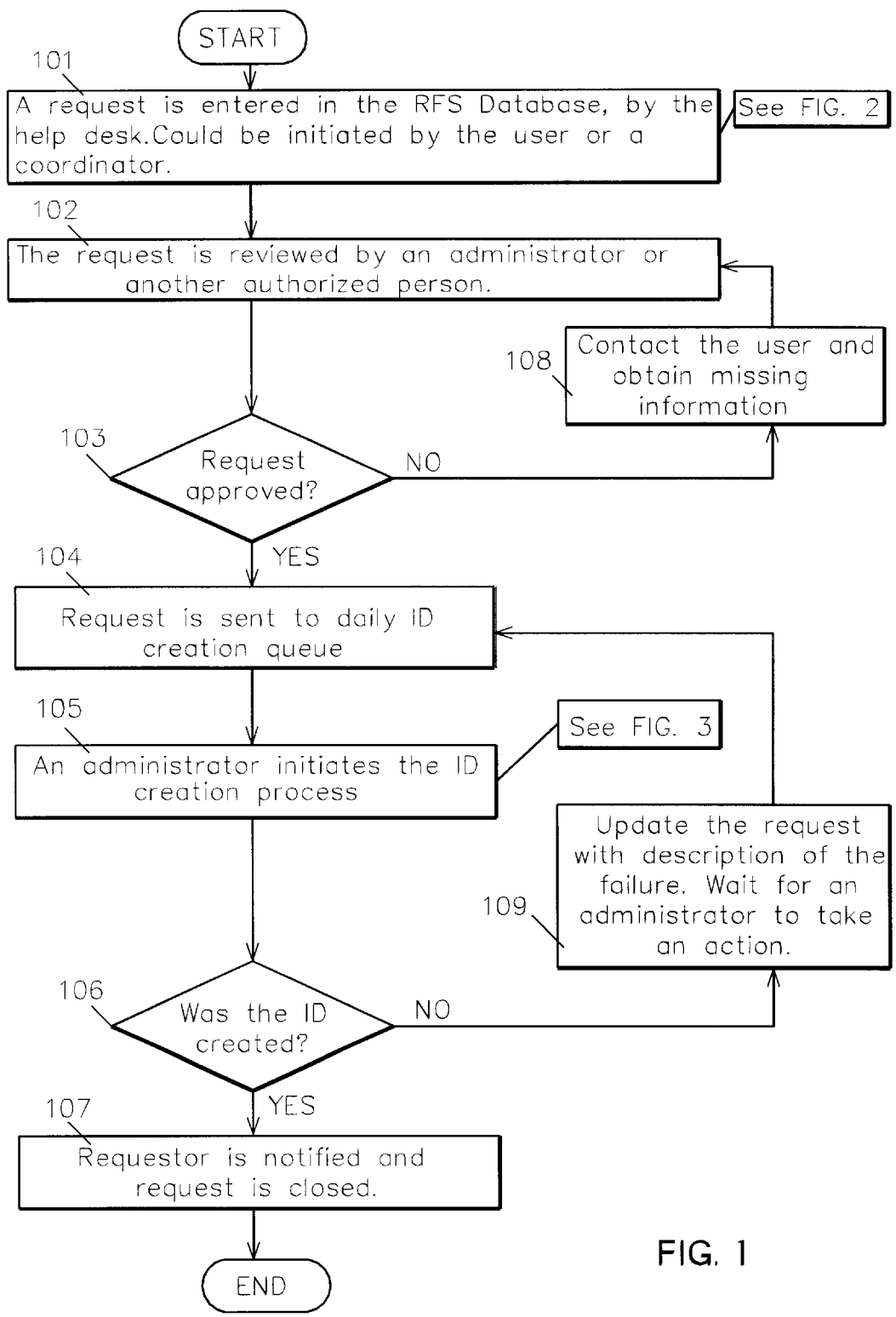
FIG. 1 is a block diagram of the user ID creation process in general. It shows the major steps and data flow involved in the process.

Referring to FIG. 1, the process starts in step 101 with a request created in an RFS database 202. Usually this kind of database is called a Request For Service (RFS) database, but may also be called a source database, request database or service database, so called because it may contain not only new ID requests, but any other types of administration requests—such as name changes, ID terminations, ID recertifications, etc., and serves as a source of requests for subsequent processing by ID registration code. It can be looked upon as an ID registration request queue. Once a request is created it immediately appears in the approval queue 203. In step 102, usually an administrator or another authorized person (e.g. ID coordinator) reviews the requests in approval queue 203 at the end of the business day or, if huge amounts of ID are created daily, throughout the day. In step 103, if the request contains all the necessary data it will be approved and in step 104 sent to the approved requests (also referred to as approved documents) queue 204. If the request is rejected, then in step 108 it is directed back to the requester or the author for review. If a company's security guidelines do not require a formal ID approval process, steps 102, 103, and 108 may not exist.

In step 105, the actual ID registration can be manually executed by an administrator or run as a scheduled job. If an error occurs during step 105, which means the ID is not created, step 106 directs processing to step 109 which records what the error is in the request and the request is displayed in the error queue 205 awaiting administrator review. An administrator should review all the failures, once step 105 is completed, and perform the necessary actions (based on the description of the failure) to troubleshoot the problem. If the ID was registered successfully, in step 107 the requester is notified via e-mail and the request is closed.

Figure 2:
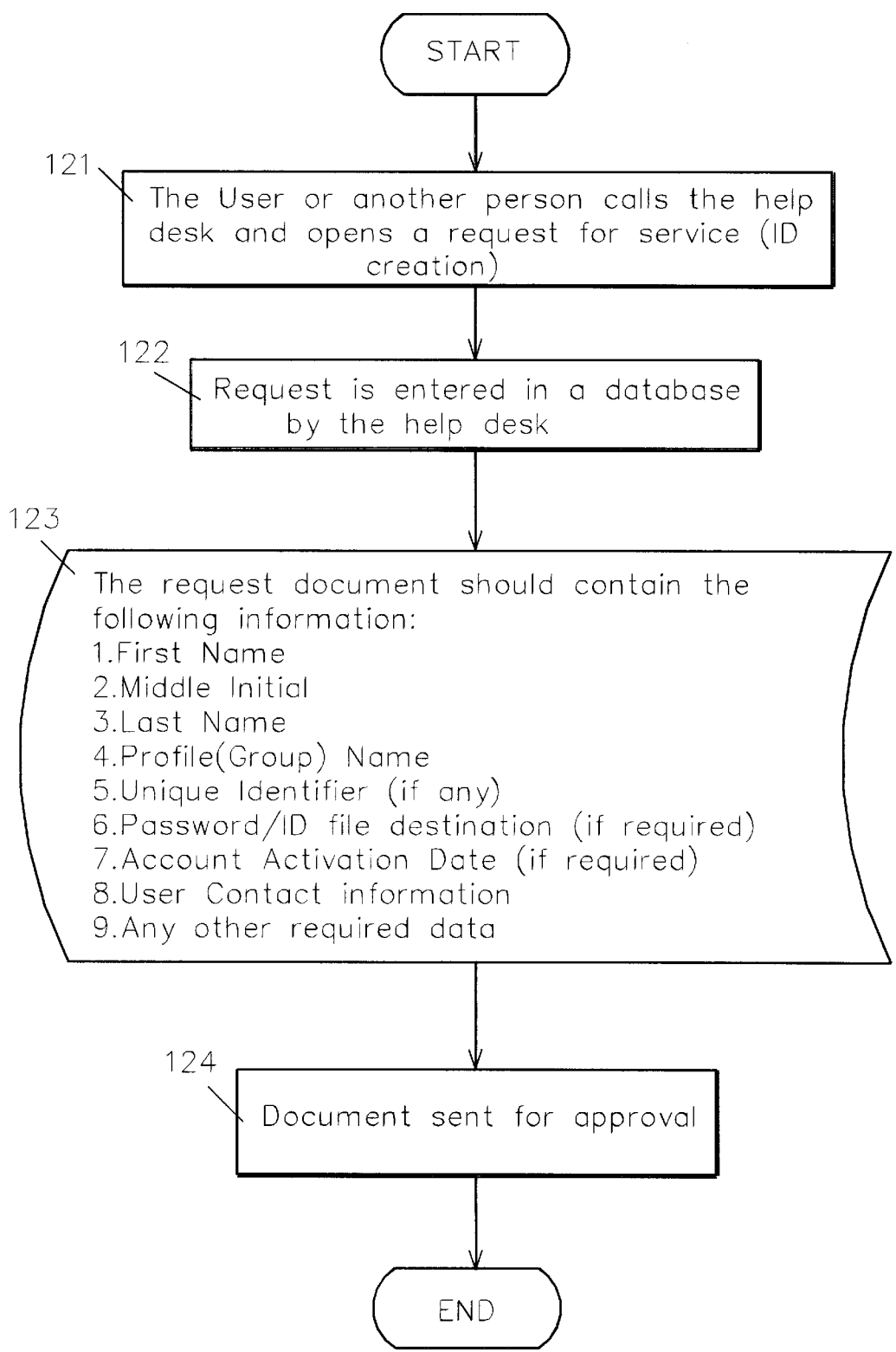
FIG. 2 shows a flowchart of the initial request and the data entered by the help desk.

Referring to FIG. 2, request initiation step 101 includes in step 121 creation of a request for service, in step 122 entering of the request into the database 202, and in step 124 sending a request document for approval. Step 123 specifies the information that is contained in a request 201, including (1) first name, (2) middle initial, (3) last name, (4) profile (group) name, (5) unique identifier (if any), (6) password or identifier (ID) file destination (if required), (7) account activation date (if required), (8) user contact information, and (9) any other required data. Only the first 4 fields listed in step 123 are usually required, all the others being qustomizable based on the company's security guidelines. The request document 201 described in step 123 can also be used for other system administration tasks, such as client installs, upgrades, etc., along with ID creation, so the request document may include more information, as appropriate. If a piece of information is missing, but if it can be recovered from any other field(s), then the request can be approved 124 and modifications performed in step 132 (FIG. 3).

Figure 3A:
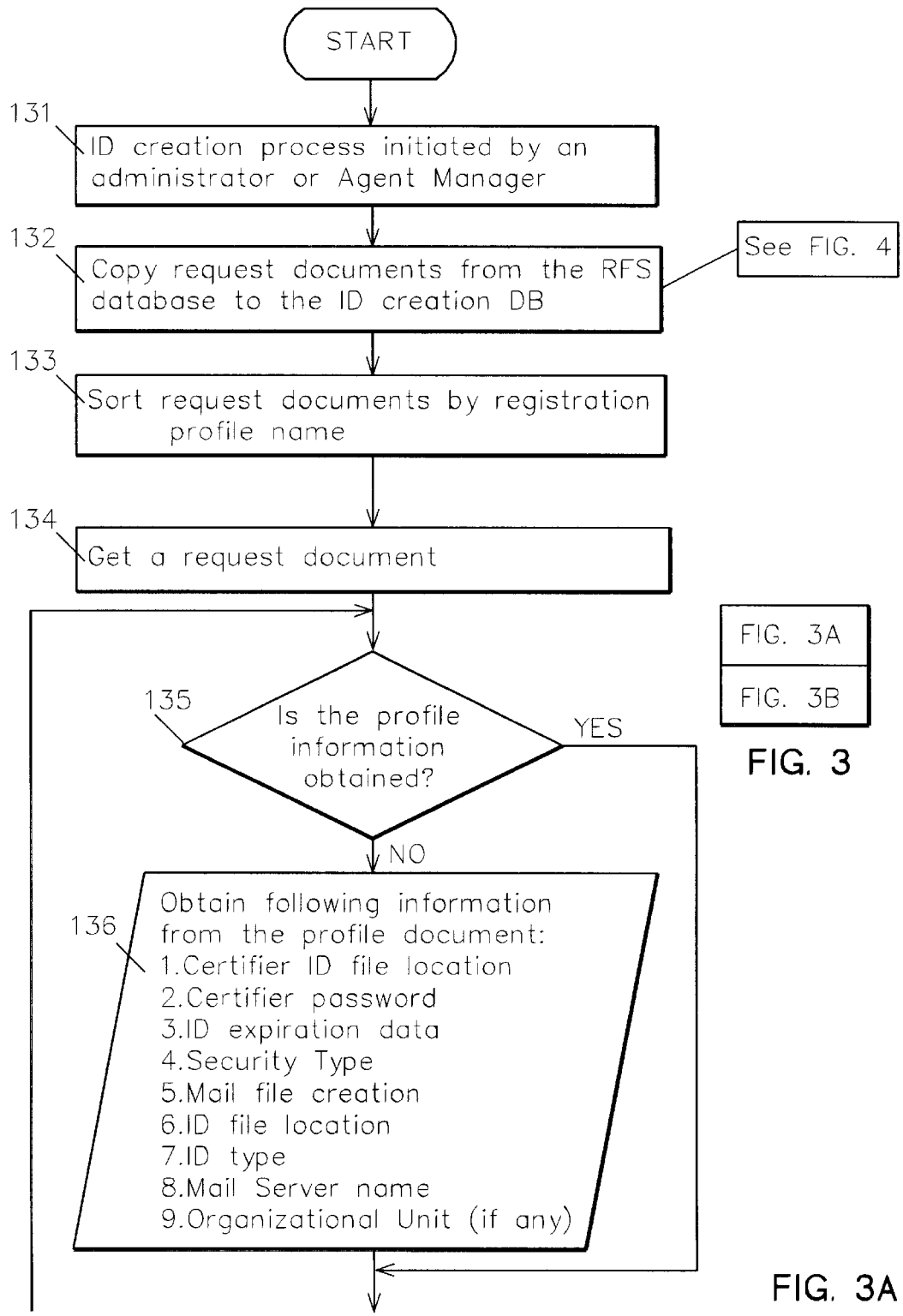
FIGS. 3A and 3B, arranged as shown in FIG. 3, describe the user registration process. It provides information about the registration information contained by the profile document. Every step of the process is presented as a separate block.
Figure 3B:
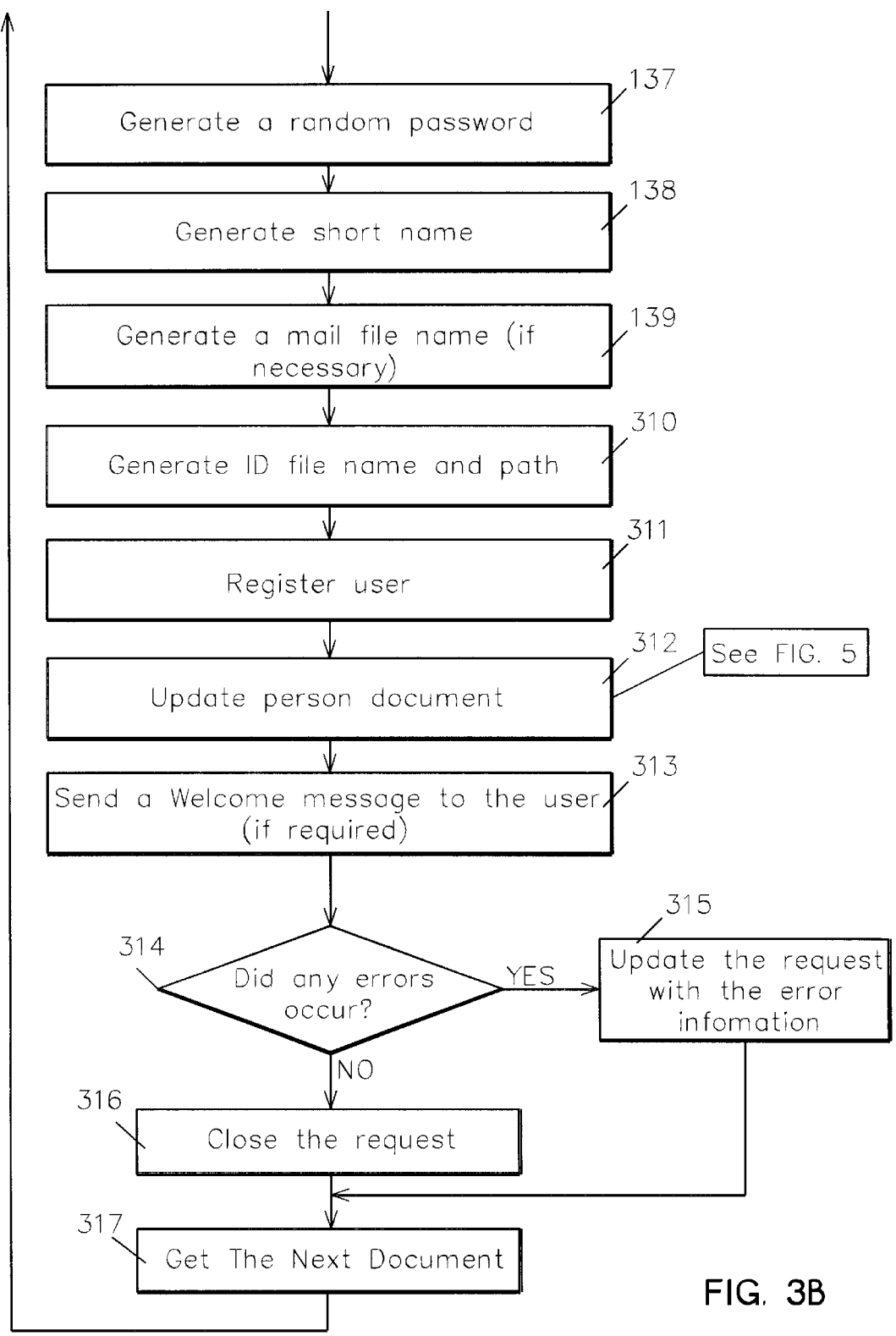

Referring to FIG. 3, the user ID creation process of step 105 is further described. Once it is started in step 131, in step 132 registration code 211 copies all approved request documents stored in queue 204 in the RFS database 202 to the ID creation database 210. The registration code 211 may make modification to the request document 201 in order to fit the field names and data types as required by later stages of the process. For example user name parsing may be required, or generation of an organization using based on preexisting conditions may be necessary. Once all approved request documents 204 are copied over from the RFS database 202 to the ID creation database 210, in step 133 they are sorted by registration profile name. In step 134 a request document is obtained for processing, and at step 135 it is determined if the required profile information is available. Each request should have an assigned profile. A profile can be selected when the request is created or at a later stage—for instance, when copied to the ID creation database 210. Profile documents 213 described in 136 reside in the ID creation database 210, however their names are available to all users (particularly if they are to be selected during the request creation). These documents 213 describe the ID creation specifics for a group of users or a department, such as (1) certifier ID file location, (2) certifier password, (3) ID expiration date, (4) security type, (5) mail file creation, (6) ID file location, (7) ID type, (8) mail server name, and (9) organizational unit. For example all users in EST time zone may use a profile document, which points to an EST mail server, all CST users may use a different profile with a CST mail server. A customized welcome message may also be a part of the profile document 213.

The reason why the request documents are sorted by a profile name in step 133 is that the profile information is obtained once and used for all requests with the same profile name. By doing that if the password is not set in the profile document 213, a certifier password prompt will be displayed only once. In some Notes environments, for example, there is a requirement that only two or more physically present administrators can perform ID creation, and the present invention provides this capability. If the profile information is obtained in step 135, then in step 137 a random initial password is generated per that user ID. The password should follow the security guidelines. A recommended format for this password is: Upper and Lower case, at least one numerical symbol, and at least 8-symbol length. In step 138, the short name is generated. The "short name" is an alias of the actual user name. Its length is limited and is usually alpha-numeric only, and unique within a company. Step 138 generation of the short name could be very complicated. For example, in a Notes Domain, the short name should be unique. It could follow the "first letter of the first name and the first 7 letters of the last name" standard or any other combination of the characters in a user name. Other short name formats could be based on the Organizational Unit field (if this field is related to a unique employee number). Selection of the short name format is made in the profile document 213. If a mail file 220 is to be created, in step 139 the mail file name is generated. The mail file name usually follows the short name format. The mail file name is usually pre-pended by a mail directory name. Both names are specified in the profile document 213. If ID file 220 is supposed to be detached to a file server 221, in step 310 the ID file location path is appended with ID file name. ID file 220 name could also follow the short name format. ID file 220 parameters are specified in the profile document 213. Once the registration information is generated, a registration procedure of registration code 211 is called. This procedure creates an ID file 220, a person document 224 and a mail file 225 for the user. In step 312, code 211 then finds that person document in the Notes Directory 226 and sends it to an update procedure. The person document is created by the registration code in the Notes directory, however the code does not return a hook to that document, so after it has been created the code needs to find it and pass it on to the next stages of the code. At this point any kind of customizations can be made and any additional tasks can be performed. An example would be sending the initial password to a designed person (user's manager or an ID coordinator). If a welcome message is supposed to be sent, in step 313 it may be done after the Notes Directory 226 is replicated to the user's mail server 221. Otherwise the server 221 will not be able to deliver the message. If, as is determined in step 314, no errors occurred while the request was processed, in step 316 the request is closed and in step 317 the next request is obtained. If the request failed, in step 315 the error information is recorded. The request is then sent to the failure queue 205 for review and further processing.

Referring to FIG. 4, copy step 132 is further described, including details of a few of the possible steps of request translation between RFS dababase 202 and ID creation database 210. In step 141, first the code 211 obtains the location of the RFS database 202 from the default profile 214. This profile 214 is different from the group/department profile document 213. There can be only 1 default profile, because it contains settings relevant to the entire company. Information like RFS 202 location, RFS source view name, back-up server name (if any), minimum password length, etc., is contained in this profile document 214. In step 142, the source view is obtained from default profile 214, which displays all new ID creation requests queued in the RFS database 202. This view separates ID creation requests in approval queue 204, for example, from any other types of documents that might reside in the database 202, as well as any closed, canceled or in process ID creation request documents. In step 143, all documents listed in this source view are copied to the ID creation DB 210. A few of the possible tasks that can be performed at this point, along with the physical migration of request documents, are: in step 144, parsing the user name to First Name, Middle Initial (if any) and Last Name; in step 145, assigning a registration profile name, if one has not been formally assigned during the request creation; in step 146, generating a unique identifier based on preexisting conditions (current status of the Notes Directory for instance) or any other fields that are referred in the profile document. In steps 147 and 148, once all documents in the RFS queue 293 are copied to the ID creation database 210, the procedure is completed.

Referring to FIG. 5, once the user is registered in step 311, an update procedure is called by step 312. Various tasks can be preformed at this time. Along with updating fields in the person document in step 154, in steps 151 and 152 the initial password and/or ID file can be sent to a designed person referenced in the request document. This person is usually user's manager or a department ID coordinator. In step 153, if an ID/Password repository is maintained, that database is updated with the new ID/password. This kind of database is very useful in the case where the user later on forgets the password or the user's ID file becomes corrupted. In step 154, a replica of the mail file can be created on a back-up server, if one is maintained. In step 156, any other company specific tasks can also be performed at this point in processing.

Inasmuch as a preferred embodiment of the invention is particularly advantageous for Lotus Notes/Domino user ID creation, Table 1 provides LotusScript code, representing a possible Lotus Notes implementation of the invention. This LotusScript code is just one example how this very important and complicated process can be automated. The example makes a few assumptions: default profile name is "(DefaultIDProfile)", department profiles are displayed in "Configurations" view and "NewReq" view sorts only the new request by profile name. "CopyDocs" and "UpdateDocs" procedures are actually entry points to the main script code. These subroutines are not provided since they are very company specific, but they are described in FIGS. 4 and 5, supra. NAB refers to the Lotus name and address book, also and more recently referred to as the Lotus Notes directory.

TABLE 1

LOTUS SCRIPT CODE IMPLEMENTATION

Sub Initialize (FIG. 5)

```
    .
    .
    .
Set db1 = s.CurrentDatabase
Dim nabdb As New NotesDatabase(db1.Server,"names")
Set view2 = db1.GetView("Configurations")
Set nabview = nabdb.GetView("($Users)")
Set dprofdoc = db1.GetProfileDocument
    ("(DefaultIDProfile)")
If dprofdoc Is Nothing Then
    Messagebox "The Default Profile document is
missing!!!", 16, "Error !"
    Exit Sub
End If
'First Entry Point — Copy Docs from Source DB to the ID
Creation DB
Call CopyDocs(dprofdoc)
Set view3 = db1.GetView("NewReq")
Reg.CertLog = "certlog.nsf"
Next1st = (Month(Today) Mod 12) + 1 & "/01/"
curprof = ""
Set doc = view3.GetFirstDocument
While Not (doc Is Nothing)
```

TABLE 1-continued

LOTUS SCRIPT CODE IMPLEMENTATION

```
'Get User's Profile
If (curprof <> doc.RegProfileName(0)) Then
    Set profdoc = view2.GetDocumentByKey
        (doc.RegProfileName(0))
    If profdoc Is Nothing Then
        NewIdRequest = "Failure"
        NIDFailureReason = "Profile doc is
missing or not specified."
        Goto L1
    End If
    Reg.CertIDFile = profdoc.IDFileLocation(0)
    Reg.CertPass = profdoc.IDPassword(0)
    Reg.ExpDate = Datevalue( Next1st &
        (Year(Today) +(Month(Today) \ 12) +
        Val(profdoc.ExpDate(0))))
    curprof = doc.RegProfileName(0)
    'Calculate ID Creation Flags
    Flags = 9       'CreateIDFileNow &
                CreateAddrBookEntry
    If profdoc.SecurityType(0) = "North American"
        Then
            Flags = Flags + 2
    End If
    If profdoc.CrMailFile(0) = "1" Then
        Flags = Flags + 4
    End If
    'Get ID File Location
    idstor = Evaluate("@Contains (IDFileStorage;
        ""In Public Address Book"")*512+@Contains
        (IDFileStorage;""In Directory"")*64",
        profdoc)
    Flags = Flags + idstor(0)
    'Get Security Type
    If profdoc.IDType(0) = "Lotus Notes Desktop"
        Then
            Flags = Flags + 256
    End If
    'Get Mail Server
    MailServer = EvalToString(profdoc,
        "@Name([CN];@UpperCase(RegMailServer))")
End If
'Reset Status Variables
NewIdRequest = "Complete"
NIDBuildDate = ""
NIDFailureReason = ""
NABOwner = ""
'Generate Password
pass = GeneratePass(Val(profdoc.IniPwdLen(0)))
'Generate ShortName
If profdoc.SNRule(0) = "" Then
    sname = GenerateShortName(doc.FirstName(0),
        doc.MiddleInitial(0),doc.LastName(0))
Else
    sname = EvalToString(doc, profdoc.SNRule(0))
End If
If sname = "" Then
    NewIdRequest = "Failure"
    NIDFailureReason = "Incorrect short name."
    Goto L1
End If
'Get the Mail File Name & Path
mailfname = ""
If profdoc.CrMailFile(0) = "1" Then
    If profdoc.MailFile(0) = "" Then
        mailfname = sname
    Else
        mailfname = EvalToString(doc,
profdoc.MailFile(0))
    End If
End If
If profdoc.MailDirectory(0) <> "" Then
    mailfname = profdoc.MailDirectory(0)
        & "\" & mailfname
End If
'Get ID File Name & Path
If profdoc.IDFileName(0) = "" Then
    idloc = sname
Else
    idloc = EvalToString
        (doc,profdoc.IDFileName(0))
End If
If profdoc.InputFileName(0) <> "" Then
    idloc = profdoc.InputFileName(0) &
        "\" & idloc
End If
idloc = idloc & ".id"
'Get Org Unit
If profdoc.OrgUnit(0) = "" Then
    OU = ""
Else
    OU = EvalToString(doc,profdoc.OrgUnit(0))
End If
'Register User
On Error Goto LErr
cert = Reg.UserReg( doc.LastName(0), idloc,
    profdoc.RegMailServer(0), doc.FirstName(0),
    doc.MiddleInitial(0) , mailfname, pass, OU,
    db1.Server , Flags, Val(profdoc.MinPwdLen(0)))
If Left&(cert,5) = "Error" Then
    NewIdRequest = "Failure"
    NIDFailureReason = cert
    Goto L1
End If
'Get Person Document
Call nabview.Refresh
UserName = EvalToString(doc,"@Trim(FirstName +
    "" "" + MiddleInitial + "" "" + LastName)")
If OU <> "" Then
    UserName = "CN=" & UserName & "/OU=" & OU
End If
UserName = UserName & "/" & Cert
Set nabdoc = nabview.GetDocumentByKey(UserName)
If nabdoc Is Nothing Then
    NewIdRequest = "Failure"
    NIDFailureReason = "Not found in the NAB"
    Goto L1
End If
'Update WorkRecord
NIDBuildDate = Today
NABOwner = nabdoc.Owner(0)
'Update Person Doc
nabdoc.ShortName = sname
nabdoc.LocalAdmin = profdoc.LocalAdmin
Call nabdoc.Save(False,True)
'Send Welcome Note
result = profdoc.GetItemValue("WMsg")
If result(0) <> "" Then
    'Replicate NAB
    Call nabdb.Replicate
        (profdoc.RegMailServer(0))
    Set tempdoc4 = New NotesDocument(db1)
    tempdoc4.Form = "Memo"
    tempdoc4.Subject ="Welcome! Please read this
        important note"
    tempdoc4.SendTo = nabdoc.Owner(0)
    Set wmitem = profdoc.GetFirstItem( "WMsg" )
    Call wmitem.CopyItemToDocument
        ( tempdoc4, "Body" )
    Call tempdoc4.Send(True)
    doc.WelcomeSent = "1"
End If
L1:
'Set Status Fields in Request Doc
doc.NewIdRequest = NewIdRequest
doc.NIDBuildDate = NIDBuildDate
doc.NIDFailureReason = NIDFailureReason
doc.Password = Pass
doc.Owner = NABOwner
doc.IDFile = idloc
'Second Entry Point — Update Status fields,
    Send Password, Create DB replica on a backup
server, etc.
Call UpdateDocs(doc, nabdoc,dprofdoc)
Set docNext = view3.GetNextDocument(doc)
```

TABLE 1-continued

LOTUS SCRIPT CODE IMPLEMENTATION

```
        Call doc.Save(False,True)
        'Get Next document
        Set doc = docNext
    Wend
    Exit Sub
LErr:
    NewIdRequest = "Failure"
    NIDFailureReason = Error$
    Resume L1
End Sub
```

Aspects of the present invention may be implemented as database templates, customized by profile documents that define the ID registration process. Such a process may be used in web based applications, such as Lotus Notes/Domino, Netscape and other Internet/intranet information servers.

Advantages Over the Prior Art

It is an advantage of the invention that there is provided a reliable and robust system and method for performing user registration.

It is a further advantage of the invention that there is provided a system and method for registering user identifiers (ID's) for distributed systems.

It is a further advantage of the invention that there is provided a system and method for registering user ID's for distributed mail and application systems.

It is a further advantage of the invention that there is provided a system and method for addition of newly created IDs to specific groups of IDs.

It is a further advantage of the invention that there is provided a system and method for automating ID registration.

It is a further advantage of the invention that there is provided a system and method for providing a plurality of certifiers for use in initial ID registration.

It is a further advantage of the invention that there is provided a system and method for generating user ID files, verifiable by a certifier, for storage on the user's desktop.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

I claim:

1. A method for creating a user identifier (ID) for mail and application systems, comprising the steps of:
    receiving an ID request from a user into a source database;
    approving and storing said ID request into an ID creation queue;
    initiating an ID creation process with respect to said ID creation queue;
    creating and designated to said user an e-mail storage facility;
    responsive to said ID creation process, selectively upon success notifying said user and closing said ID request; and
    enabling said user to manage selected application system resources.

2. The method of claim 1, said ID creation process including the steps of:
    moving said ID request from said ID creation queue to an ID creation database;
    obtaining a business unit registration profile corresponding to said ID request for enforcing business unit ID creation parameters; and
    responsive to said registration profile and said ID request, generating said user ID.

3. The method of claim 2, further including the steps of:
    said moving step including moving a plurality of ID requests to said ID creation database;
    arranging said ID requests by registration profile name; and
    generating said user IDs by registration profile grouping.

4. The method of claim 1, further comprising the step of selectively upon failure updating said ID request with a failure indication.

5. The method of claim 2, said ID request including user name and profile name, and optionally including a unique identifier, an ID file destination, an account activation date, and user contact information.

6. The method of claim 5, further comprising the steps:
    responsive to information in said ID request and in a selected registration profile, selectively:
        creating a user ID file;
        creating a person document in an address book;
        creating a mail file;
        selecting type of ID, license and shortname, expiration period, and organizational unit;
        creating a document in a password and ID database;
        sending a welcome note to said user;
        sending a password and ID file to a designated person;
        creating a mail file replica on a backup server;
        utilizing a certifier with a plurality of passwords;
        adding new users to groups; and
        enforcing corporate ID standards to a profile of a business unit.

7. A method for registering user identifiers (ID) for mail and application systems, comprising the steps of:
    receiving a plurality of ID requests into a source database;
    copying said ID requests from said source database to an ID creation database;
    responsive to said ID request, obtaining a user profile;
    sorting said ID requests in said ID creation database by user profile identifying indicia;
    creating and designated to said user an e-mail storage facility;

responsive to said ID request and said user profile, creating a user ID; and enabling said user to manage selected application system resources.

8. A system for administering user identifiers for mail and application systems, comprising:

means for accepting a database containing a plurality of requests for new user ID's sorted by predefined ID creation profiles;

means for accessing a plurality of certifiers for each of the requests to create the user ID with and for future verification of the ID;

means for creating and designated to said user an e-mail storage facility;

means coupled to said means for accessing for placing each user into one or more predefined groups, each of the groups having-access to predefined databases; and means for enabling said user to manage selected application system resources.

9. The system of claim 8, further comprising:

means coupled to said means for accessing for sending welcome notes to said user;

means coupled to said means for accessing for generating and sending initial passwords and user ID's to one or more designated persons for each user.

10. An user identifier (ID) administration system, comprising:

a request for service (RFS) database, including an approval queue and an error queue;

an ID creation database including registration code, an approved requests file, and a profile documents file;

said RFS database being operable for receiving a plurality of ID requests for new user IDs in said approval queue;

said registration code being operable for moving said ID requests to said approved requests file and processing said ID requests in accordance with business unit parameters to generate new user IDs and certificates for enabling said user to exchange encrypted mail and manage selected application system resources.

11. The user identifier administration system of claim 10, said registration code being further operable for sorting said plurality of ID requests by profile and processing said ID requests in profile groups to generate new user IDs.

12. The user identifier administration system of claim 10, said request for service database being operable for storing a plurality of request types including said ID requests and other administration requests, and including name change requests, ID termination requests, and ID recertification requests.

13. A program storage device readable by a machine, tangibly embodying a program of instructions executable by a machine to perform method steps for creating a user identifier (ID) for mail and application systems, said method steps comprising:

receiving an ID request from a user into a source database;

approving and storing said ID request into an ID creation queue;

initiating an ID creation process with respect to said ID creation queue for generating new user IDs and certificates in accordance with business unit parameters for enabling said user to exchange encrypted mail and manage selected application system resources;

creating and designated to said user an e-mail storage facility;

responsive to said ID creation process, selectively upon success notifying said user and closing said ID request; and enabling said user to manage selected application system resources.

14. An article of manufacture comprising:

a computer useable medium having computer readable program code means embodied therein for creating a user identifier (ID) for mail and application systems, the computer readable program means in said article of manufacture comprising:

computer readable program code means for causing a computer to effect receiving an ID request from a user into a source database;

computer readable program code means for causing a computer to effect approving and storing said ID request into an ID creation queue;

computer readable program code means for causing a computer to effect initiating an ID reation process with respect to said ID creation queue for generating new user IDs and certificates in accordance with business unit parameters for enabling said user to exchange encrypted mail and manage selected application system resources; and computer readable program code means for causing a computer to effect responsive to said ID creation process, selectively upon failure updating said ID request with a failure indication and upon success notifying said user and closing said ID request.

15. A computer program product or computer program element for creating a user identifier (ID) for mail and application systems according to the steps of:

receiving an ID request from a user into a source database;

approving and storing said ID request into an ID creation queue;

initiating an ID creation process with respect to said ID creation queue for generating new user IDs and certificates in accordance with business unit parameters for enabling said user to exchange encrypted mail and manage selected application system resources; and responsive to said ID creation process, selectively upon failure updating said ID request with a failure indication and upon success notifying said user and closing said ID request.

* * * * *